US012638396B2

(12) United States Patent
Fahrbach et al.

(10) Patent No.: US 12,638,396 B2
(45) Date of Patent: May 26, 2026

(54) PROCESSOR FOR DEMIXING A FLUORESCENT-LIGHT INPUT SIGNAL, FLUORESCENCE MICROSCOPE AND FLUORESCENCE MICROSCOPY METHOD

(71) Applicant: Leica Microsystems CMS GmbH, Wetzlar (DE)

(72) Inventors: Florian Fahrbach, Mannheim (DE); Lars Friedrich, Weinheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 843 days.

(21) Appl. No.: 17/898,573

(22) Filed: Aug. 30, 2022

(65) Prior Publication Data

US 2023/0063660 A1    Mar. 2, 2023

(30) Foreign Application Priority Data

Sep. 2, 2021    (EP) ..................................... 21194613
Jan. 14, 2022    (EP) ..................................... 22151642

(51) Int. Cl.
G01N 21/64        (2006.01)
(52) U.S. Cl.
CPC ..... G01N 21/6458 (2013.01); G01N 21/6408 (2013.01); *G01N 2021/6421* (2013.01);
(Continued)
(58) Field of Classification Search
CPC ........... G01N 21/6458; G01N 21/6408; G01N 2021/6421; G01N 2021/6423;
(Continued)

(56) References Cited

U.S. PATENT DOCUMENTS 5,296,703 A * 3/1994 Tsien ..................... H04N 1/053
359/368

FOREIGN PATENT DOCUMENTS

WO    WO 2021/102140 A1    5/2021

OTHER PUBLICATIONS

C. D. Salthouse, R. Weissleder and U. Mahmood, "Development of a Time Domain Fluorimeter for Fluorescent Lifetime Multiplexing Analysis," in IEEE Transactions on Biomedical Circuits and Systems, vol. 2, No. 3, pp. 204-211, Sep. 2008, doi: 10.1109/TBCAS. 2008.2003195. (Year: 2008).*
(Continued)

*Primary Examiner* — Stephanie E Bloss
(74) *Attorney, Agent, or Firm* — LEYDIG, VOIT & MAYER, LTD.

(57)        ABSTRACT

A processor for demixing a fluorescent-light input signal of a fluorescence microscope, the fluorescent-light input signal including at least two fluorescence emission responses that overlap in time, each of the at least two fluorescence emission responses being representative of an individual impulse response of a fluorophore to a fluorescence-triggering light pulse of a clocked time series of fluorescence-triggering light pulses, the processor: receiving a trigger signal comprising a time series of time markers, the trigger signal being representative of a clocking rate, at which the clocked time series of fluorescence-triggering light pulses is generated; and separating at least one fluorescence emission response from the fluorescent-light input signal.

12 Claims, 4 Drawing Sheets

(52) U.S. Cl.
CPC ................ *G01N 2021/6423* (2013.01); *G06T 2207/10056* (2013.01)

(58) Field of Classification Search
CPC .. G01N 2021/6441; G06T 2207/10056; G02B 21/365; G02B 21/0076; G02B 21/0084
See application file for complete search history.

(56) References Cited

OTHER PUBLICATIONS

Regina Won Kay Leung, Shu-Chi Allison Yeh, and Qiyin Fang, "Effects of incomplete decay in fluorescence lifetime estimation," Biomed. Opt. Express 2, 2517-2531 (2011) (Year: 2011).*
Scipioni Lorenzo et al: "Phasor S-FLIM: a new paradigm for fast and robust spectral fluorescence lifetime imaging", Nature Methods, Nature Publishing Group US, New York, vol. 18, No. 5, Apr. 15, 2021 (Apr. 15, 2021), pp. 542-550, XP037446127.

* cited by examiner

1

PROCESSOR FOR DEMIXING A FLUORESCENT-LIGHT INPUT SIGNAL, FLUORESCENCE MICROSCOPE AND FLUORESCENCE MICROSCOPY METHOD

CROSS-REFERENCE TO PRIOR APPLICATION

Priority is claimed to European Patent Applications No. EP 21194613.2, filed on Sep. 2, 2021, and No. EP 22151642.0, filed on Jan. 14, 2022, the entire disclosures of which are hereby incorporated by reference herein.

FIELD

The following relates to a processor, to a fluorescence microscope, a computer-implemented method, a computer program, a computer-readable storage medium and a fluorescence microscopy method, all for demixing a fluorescent-light input signal of a fluorescence microscope.

BACKGROUND

Fluorescence-light input signals, their processing as well as any measurements based on fluorescence are dependent on the decay time of the fluorophores used.

SUMMARY

In an embodiment, the present disclosure provides a processor for demixing a fluorescent-light input signal of a fluorescence microscope, the fluorescent-light input signal comprising at least two fluorescence emission responses that overlap in time, each of the at least two fluorescence emission responses being representative of an individual impulse response of a fluorophore to a fluorescence-triggering light pulse of a clocked time series of fluorescence-triggering light pulses, the processor being configured to: receive a trigger signal comprising a time series of time markers, the trigger signal being representative of a clocking rate, at which the clocked time series of fluorescence-triggering light pulses is generated; and separate at least one fluorescence emission response from the fluorescent-light input signal.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

2

Figures 5, 6, 7, 8:
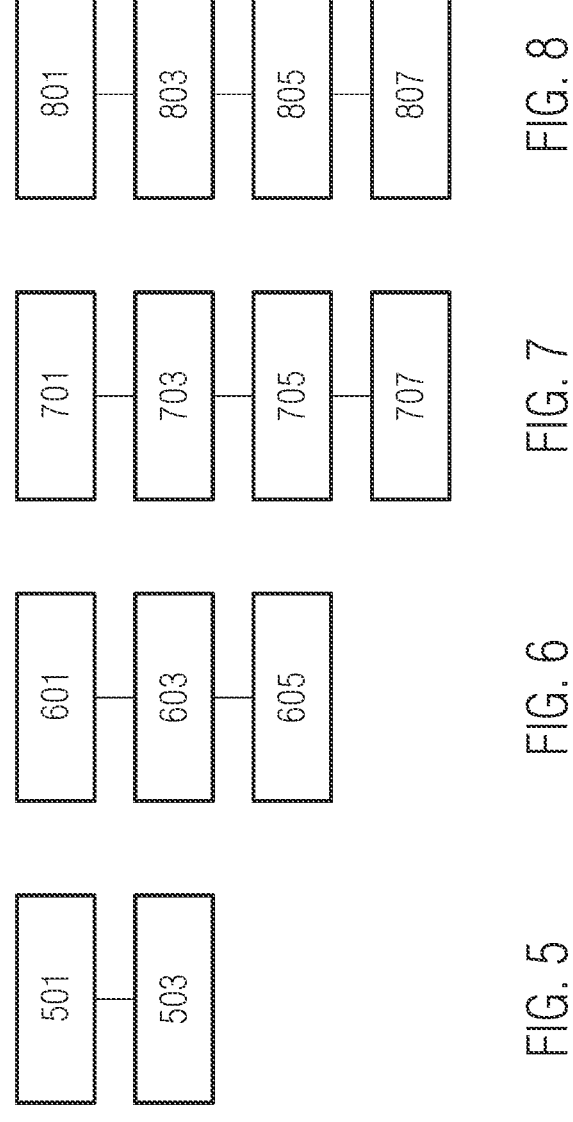
FIG. 5 a schematic flow chart of an embodiment of the inventive method.
FIG. 6 a schematic flow chart of another embodiment of the inventive method.

FIG. 7 a schematic flow chart of another embodiment of the inventive method; and FIG. 8 a schematic flow chart of another embodiment of the inventive method.

DETAILED DESCRIPTION

In order to record a fluorescence image of an object, the object is scanned pointwise. At each point the decay time determines the time necessary to record the fluorescence information at this scanning point. Thus, there is a need to carry out fluorescence measurements that allow to record fluorescence information of as many scanning points as possible in the shortest time possible. It would be beneficial therefore to reduce the time necessary for performing a fluorescence measurement.

This may be obtained by a processor for demixing a fluorescent-light input signal of a fluorescence microscope, wherein the fluorescent-light input signal comprises at least two fluorescence emission responses that overlap in time, wherein each of the at least two fluorescence emission responses being representative of an individual impulse response of a fluorophore to a fluorescence-triggering light pulse of a clocked time series of fluorescence-triggering light pulses, in that the processor is adapted to receive a trigger signal comprising a time series of time markers, the trigger signal being representative of a clocking rate at which the clocked time series of fluorescence-triggering light pulses is generated, the processor further being adapted to separate at least one fluorescence emission response from the fluorescent-light input signal.

Further, a solution to the above problem for the fluorescence microscope is that the fluorescence microscope comprises such a processor.

Another solution for the above problem is to provide a computer-implemented method for demixing a fluorescent-light input signal of a fluorescence microscope, wherein the fluorescent-light input signal comprising at least two fluorescence emission responses that overlap in time, each of the at least two fluorescence emission responses being representative of an individual impulse response of a fluorophore to a fluorescence-triggering light pulse of a clocked time series of fluorescence-triggering light pulses, is that the computer-implemented method comprises the steps of receiving a trigger signal comprising a time series of time markers, the trigger signal or the reference signal being representative of a clocking rate, at which the clocked time series of fluorescence-triggering light pulses is generated, and the step of separating at least one fluorescence emission response from the fluorescent-light input signal.

A further solution to the above problem is a computer program comprising instructions which, when the program is executed by a computer, cause the computer to carry out one embodiment of the inventive computer-implemented method, a computer-readable medium comprising instructions which, when executed by a computer, cause the computer to carry out one embodiment of the inventive computer-implemented method and a fluorescence microscopy method, comprising generating of clocked fluorescence-triggering light pulses at a clocking rate and further comprising one embodiment of the inventive computer-implemented method.

The above solutions have the advantage that limitations of a measuring speed that are due to the decay time are overcome. It is thus not necessary to wait for a fluorescence signal to decay to a predetermined value (usually the 1/e or $1/e^2$ value, with e being the Euler number). The fluorescence emission responses may overlap each other in the fluorescent-light input signal.

Further features may improve the above described solutions. These features are independent from one another and may be arbitrarily combined with each other.

The trigger signal may be an external trigger signal or an internal trigger signal. An internal trigger signal is e.g. generated by the processor; an external signal may be generated by a device which is outside of the processor, such as a laser controller, a detector, or a separate triggering device such as a clock generator. An internal trigger signal may also be designated as a reference signal in the following.

The fluorescent-light input signal may be generated by a detector that may a) count fluorescence emission responses being representative of an individual impulse response of a fluorophore to a fluorescence-triggering light pulse in a time interval (representing a time marker) or b) generate a signal proportional to the number of fluorescence photons detected in a time interval (representing a time marker) or c) record the time points (representing a time marker) of the respective detection of individual fluorescence photons, wherein the generation of fluorescence photons may be triggered by the fluorescence-triggering light pulses in a sample containing fluorophores. The time interval and time points may be markers with a fixed relationship to the clocking rate.

The processor may be adapted to receive a trigger signal that may also be provided to the processor as part of the fluorescent-light input signal, the time series of time markers being representative of a clocking rate at which the clocked time series of fluorescence-triggering light pulses are generated. The trigger signal may provide information at what time and with what delay with respect to the fluorescence-triggering light pulses the fluorescence photons constituting the fluorescent-light input signal are generated.

In some embodiments, the trigger signal may be generated from the fluorescent-light input signal itself, e.g. from an integrated signal being derived from single photon events. The processor may be adapted to generate the trigger signal, preferably by analysis of the fluorescent-light input signal, e.g. Fourier transformation and/or the set clocking rate.

The fluorescent-light input signal may be composed of a time difference between the last preceding fluorescence-triggering light pulse and the detection of a fluorescence photon by a detector, the detector providing the fluorescent-light input signal consisting of a series of time points at which photons were detected. Alternatively, the fluorescent-light input signal may be representative of a number of individual impulse responses of fluorophores detected by the detector during a time interval with a fixed relationship to the clocking rate, e.g. the accumulated photons during a period corresponding to the clocking interval (the inverse of the clocking rate).

The purpose of the trigger signal may be to provide the processor with a timing reference for demixing of the fluorescent-light input signal.

More specifically, the trigger signal may allow to determine the time difference between the fluorescence-triggering light pulse and the detection of the fluorescence signal, that was produced by that light pulse.

The at least two fluorescence emission responses each being representative of an individual impulse response of a fluorophore to a fluorescence-triggering light pulse of a clocked time series of fluorescence-triggering light pulses may preferably be generated by different fluorophore molecules or different sets of fluorophore molecules. The fluorophore molecules or the sets of fluorophore molecules that generate the individual impulse responses to a fluorescence-triggering light pulse and that generate the at least two fluorescence emission responses may preferably fluoresce independently from each other, i.e. no radiant or non-radiant transitions may be present between the different fluorophore molecules or different sets of fluorophore molecules. The different fluorophore molecules or different sets of fluorophore molecules may preferably be located at a distance to one another in the sample. For example, the two (or more) overlapping individual impulse responses that are to be separated may be generated by two (or more) different fluorophore molecules. As another example, the two (or more) overlapping individual impulse responses that are to be separated may be generated by two (or more) different sets of fluorophore molecules which sets are located in two (or more) different, preferably non-overlapping regions of the sample.

For example, the processor may be adapted to separate the fluorescence emission responses in dependence of at least one fluorescence decay parameter, the at least one fluorescence decay parameter representing at least one parameter of the impulse response.

Further, the at least one fluorescence decay parameter may comprise at least one of the fluorescence decay time, a conversion efficiency or a quantum yield, a wavelength dependent absorption or coefficients describing further radiative or non-radiative transitions in the fluorophore. In order to separate at least one fluorescence emission response from the fluorescent-light input signal, the processor may be adapted to calculate a decay curve or specific values of a decay curve of the fluorophore applied.

In another embodiment, the processor is improved in that it may be adapted to separate the at least one fluorescence emission response by at least one of subtracting at least one computed decay rest from the fluorescent-light input signal, the decay rest being representative of at least one portion of a decay tail of a previous fluorescence emission response, whereby the processor is adapted to compute the decay rest; linearly unmixing of the fluorescent-light input signal; phasor-based unmixing of the fluorescent-light input signal. The processor may be adapted to perform a maximum-likelihood approach. In one embodiment, the processor may be adapted to compute a decay rest of a previous fluorescence emission response, preferably of previous fluorescence emission responses, the decay tail of which overlaps with the present fluorescence emission response, i.e. fluorescence emission responses generated prior to the fluorescence emission response that is to be separated. The processor may be adapted to correct the present fluorescence emission response by subtracting overlapping portions of previous responses from the fluorescent-light input signal. The corresponding embodiment of the computer-implemented method may thus compute the decay rest and subtract it from the fluorescent-light input signal to separate the fluorescence emission response. The computation of a decay rest of a previous fluorescence emission response may be based on the relationship between properties of the trigger signal, e.g. the time interval of the clocked time series of fluorescence-triggering light pulses and the fluorescence decay parameters. The method maybe be based on statistical methods evaluating the probability for registration of a fluorescence emission response depending on the signal strength attributed to previous fluorescence-triggering light-pulses and the fluorescence decay parameters.

In another embodiment linear unmixing may advantageously be applied to separate temporarily overlapping fluorescence emission responses. The processor may thus be adapted to solve a minimization problem, i.e. to calculate a minimum difference between an unknown signal and a calculated signal composed of reference signals for all possible mixtures of the reference signals. The processor may be further adapted to solve for a minimum value of a difference equation, this calculation being straightforward and fast. The corresponding embodiment of the inventive computer-implemented method may thus comprise the steps of linearly unmixing the fluorescent-light input signal by minimizing a difference equation for separating the at least one fluorescence emission response. Linear unmixing can be employed by mathematically unmixing temporarily overlapping fluorescence emission responses using a number of fixed reference fluorescence emission responses. The reference fluorescence emission responses may be based on literature data, obtained in separate reference measurements or computed based on fluorescence decay parameters and properties of the fluorescence-triggering light pulses.

A further improvement in another embodiment may be implemented by application of phasor based unmixing. The processor may be adapted to analyze spectral images based on a phasor representation (a phasor being a complex amplitude). When applying phasor based unmixing to a fluorescence spectrum, this spectrum may be Fourier transformed, the real and imaginary components of a first harmonic of the transform are employed as spectral phasor and the spectral phasor representation allows for unmixing up to three spectral components overlapping in the spectrum. This method may also be applied for unmixing temporarily overlapping fluorescence emission responses from the fluorescent-light input signal. In this case, the signal of adjacent pixels containing the fluorescence emission responses of consecutive pulses may be processed to extract the first harmonic of the Fourier transform for unmixing of the fluorescence emission response. In one embodiment the processor may be adapted to perform such a phasor based unmixing.

In another advantageous embodiment the processor may be adapted to determine a number of subsequently generated fluorescence emission responses that overlap at a given position in the fluorescent-light input signal. The processor may be adapted to base further subsequent calculations, e.g. calculating the decay rest, on the number of overlapping fluorescence emission responses. The processor may in particular be adapted to compute the number of subsequently generated fluorescence emission responses that overlap at a given position in the fluorescent-light input signal depending on at least one of the clocking rate and at least one fluorescence decay parameter. The processor may thus be adapted to exactly determine how many fluorescence emission responses generated at different times are overlapping and to what extent they overlap (i.e. how long a decay tail of a previous fluorescence emission is detected in a subsequent fluorescence emission).

In one embodiment of the processor, the processor may be adapted to determine a start pulse of the time series of fluorescence-triggering light pulses. Therefore, the processor may be adapted to determine a start trigger from the trigger signal. If this is the case, the subsequently following event in the fluorescent-light input signal may be composed of an individual fluorescence emission response, namely the impulse response to the first fluorescence-triggering light pulse of the clocked time series of fluorescence-triggering light pulses. In one embodiment the processor may thus be adapted to bypass a subsequent calculation to separate at least one fluorescence emission response from the fluorescent-light input signal once the start trigger may be determined. This may increase measurement speed and decrease a calculation load of the processor.

In another embodiment the calculated decay rest may comprise the determined number of portions of decay tails, the processor may be adapted to subtract said decay rest from the fluorescent-light input signal, each of the decay tails corresponding to an impulse response generated by a different clocked fluorescence-triggering light pulse.

In one embodiment the processor may thus be adapted to determine a number of three overlapping fluorescence emission responses, to calculate a decay tail of a fluorescence emission response generated by a previous fluorescence-triggering light pulse, to calculate a decay tail of a fluorescence emission response generated by a fluorescence-triggering light pulse emitted before the previous fluorescence-triggering light pulse and to subtract the calculated decay tail of the fluorescence emission responses from the fluorescent-light input signal to obtain the separated present fluorescence emission response. The processor may thus be adapted to correct the fluorescent-light input signal and to calculate the separated fluorescence emission response.

In another embodiment the processor may be improved by being adapted to determine a scan position in a sample depending on the clocking rate and a scan speed, at which the clocked fluorescence-triggering light pulses are scanned over the sample. This has the advantage that the time series of fluorescence-triggering light pulses may be mapped to spatial positions on a sample, such that for each position in the sample it is known at which time this position has been illuminated.

It is advantageous if another embodiment of the fluorescence microscope further comprising a clocked illumination unit being adapted to generate the clocked fluorescence-triggering light pulses at the clocking rate. This may reduce errors that may occur if an external clocking rate is applied, e.g. due to connection problems or the like.

In yet another embodiment, the fluorescence microscope may further comprise an optical detector configured to detect emission light generated at at least two different scan positions in a sample volume, the emission light being further generated by the clocked fluorescence-triggering light pulses of the pulsed illumination light of the illumination unit, the clocked fluorescence-triggering light pulses being displaced relative to one another in both, time and position. The displacement in time may be calculated by the displacement in space and vice versa.

The clocking rate may depend on the at least one fluorescence decay parameter. This embodiment of the fluorescence microscope may thus modify, i.e. increase or decrease the clocking rate depending on the at least one fluorescence decay parameter. As a non-limiting example, the fluorescence microscope may be adapted to determine that four fluorescence emission responses overlap and may decrease the clocking rate such that only three emission responses overlap, which allows for application of phasor based unmixing. In the opposite case, if the fluorescence microscope determines that there is no overlap of subsequent fluorescence emission responses, the clocking rate may be increased, to obtain such overlapping responses for increasing a measurement speed and for reducing the time necessary for completion of the measurement.

In one embodiment of the computer-implemented method, the step of receiving a trigger signal may be comprised. The trigger signal may have different time markers as for instance at least one of a rising flank, a falling flank, zero crossing, a threshold value, specific points of a first derivative (extrema) or a second derivative (turning point) or the like. The trigger signal may provide information at what time and with what delay fluorescence-triggering light pulses are generated. The trigger signal may be applied to map a time axis of excitation events (the fluorescence-triggering light pulses) with a time axis of responses thereto (the fluorescent-light input signal over time).

The fluorescence signal detected at any given time may be generated by one of the preceding fluorescence-triggering light pulses. By mapping the time axes of both processes, it may be possible to estimate the probability for each of the triggering light pulses to actually have been the trigger for a given detected signal. The probability for light emission decreases with increasing temporal distance to the triggering light pulse, following an exponential decay, for example. The estimated probabilities can be an input to the unmixing algorithm, i.e. the demixer may be adapted to receive these estimated probabilities. Using this model may allow the unmixing algorithm to be optimized by taking the fluorescence lifetime of the emitting fluorophore and/or other physical parameters into account. According to the different embodiments described for the processor above, in one embodiment of the method, the step of separating at least one fluorescence emission response from the fluorescent-light input signal may comprise one of subtracting at least one computed decay rest from the fluorescent-light input signal, linearly unmixing of the fluorescent-light input signal and phasor-based unmixing of the fluorescent-light input signal.

In one embodiment, the method may comprise determining a number of subsequently generated fluorescence emission responses that overlap at a given position in the fluorescent-light input signal.

In another embodiment, the method may comprise the step of subtracting a calculated decay rest from the fluorescent-light input signal and/or determining the decay tails of the previous fluorescence emission response and/or the decay tail of the penultimate fluorescence emission response. This embodiment of the method may also comprise the step of adding the previous decay tail to the previous fluorescence emission response and to add the penultimate decay tail to the penultimate fluorescence emission response. The method may thus comprise the step of separating all fluorescence emission responses overlapping in the fluorescent-light input signal.

As described above, the processor may be adapted to perform a plurality of data processing steps. Different embodiments of the inventive computer-implemented method may comprise any arbitrary combination of said data processing steps in any arbitrary order described with reference to the processor above.

The embodiments of the computer-implemented method may be carried out by any kind of computer.

One embodiment of the fluorescence microscopy method may further comprise transmitting the clocked fluorescence-triggering light pulses to a sample and/or transmitting fluorescent light generated in the sample to a detector for generating the fluorescent-light input signal being representative of the generated fluorescent light. The fluorescent light input signal may be generated by a detector integrating the detected fluorescent light received in time intervals corresponding to the clocking rate (of the clocked time series of fluorescence-triggering light pulses). Alternatively, the detector may form the fluorescent light input signal from measured arrival times of individual photons of the fluorescent light. The arrival times may be stated in reference to the clocking rate of the clocked fluorescence-triggering light pulses but also in reference to a fixed time point.

In one embodiment, the processor may comprise a signal input line for receiving the fluorescent-light input signal being representative of a fluorescence emission signal that comprises the at least two fluorescence emission responses overlapping therein.

The processor may comprise a storage unit for saving predetermined fluorescence decay parameters. The processor may comprise at least one of a subtraction and addition module, a linear demixer module and a phasor-based demixer module, where in each of the modules being adapted to separate at least one fluorescence emission response from the fluorescent-light input signal.

In one embodiment, the fluorescence microscope may comprise a clocked illumination unit for generating the pulsed illumination light at the clocking rate and/or an optical system for transmitting the pulsed illumination light along an illumination path into a sample volume which may be adapted to receive a sample and/or a scanner for scanning the sample volume with the pulsed illumination light.

In one embodiment, the optical detector may be adapted to detect emission light generated at at least two different scan positions in the sample volume and the generated by adjacent pulses of the pulsed illumination light. The optical detector may comprise a single photon detector.

In one embodiment of the present invention, the fluorescence-light input signal may comprise at least one individual response to a single photon and the processor may be adapted to assign the at least one individual response to one of the at least two fluorescence emission responses The fluorescence-light input signal may in such and other cases, e.g. cases including only few photons, not be a continuous signal. The fluorescence-light input signal may be composed of at least one, preferably at least two, more preferable a multitude of individual responses to single photons. The processor that is adapted to separate at least one fluorescence emission response from the fluorescent-light input signal may thus—in case of such a non continuous fluorescence-light input signal—be adapted to sort the individual photon responses, i.e. it may be adapted to determine for each photon response, by which fluorescence-triggering light pulse of the clocked time series of fluorescence-triggering light pulses said photon response has been generated. This determination may be based on the at least one fluorescence decay parameter and/or based on the clocking rate. The processor may be adapted to map the individual fluorescence-triggering light pulses of the series of fluorescence-triggering light pulses to pixels of a recorded image and consequently to determine at which pixel the detected photon response is detected. The processor may thus be adapted to assign the at least one individual response to a single photon to the correct pixel, i.e. the pixel that represents a fluorescence emission response generated by the fluorescence-triggering light pulse that generated the single photon. As the pixels may be mapped to positions in the sample, the processor may be adapted to determine at which position in the sample a single photon is generated and to sort the single photon and the individual response thereto to the pixel mapped to the position in the sample where the single photon is generated.

In the process of correlating the individual photon responses to the fluorescence-triggering light pulses, the processor may also make use of a maximum likelihood approach. This means, that the processor may employ a model to estimate the probability for each triggering light pulse to be the origin of the detected emission. The model may depend on the fluorescence lifetime of the observed fluorophore and on other physical parameters. By applying this model to all possible mappings of triggering light pulses to detected emission light photons, it may be possible to select the mapping that has the highest probability and use this mapping as the output of the unmixing algorithm. The process may be iterative or non-iterative.

The processor may be adapted to determine by which fluorescence-triggering light pulse a single photon response is generated. The processor may further be adapted to assign each single photon response to the corresponding fluorescence-triggering light pulse and to sort it to the corresponding fluorescence emission response.

In the corresponding embodiment of the inventive method, individual responses to a single photon may be sorted to the corresponding fluorescence emission response, wherein this process step may comprise incrementing or decrementing a single photon counter representative of a corresponding fluorescence emission response.

As a nonlimiting example, a first fluorescence-triggering light pulse may generate an overall number of six photons at a first position in the sample, wherein at the time the second fluorescence-triggering light pulse illuminates a second position of the sample, two (or more) out of the six photons are emitted and detected for the second fluorescence-triggering light pulse at the second position in the sample. The second fluorescence-triggering light pulse may generate five photons prior to excitation of the sample by the third fluorescence-triggering light pulse In dependence on the at least one fluorescence decay parameter, in particular in dependence on the decay time, the processor may in this embodiment be adapted to calculate that two photons measured for the second fluorescence-triggering light pulse actually belong to the decay tail of a response to the first fluorescence-triggering light pulse. The processor may further be adapted to decrement a single photon counter assigned to the second position in the sample—this counter having a counter value of seven—by two and may be adapted to increment a single photon counter assigned to the first position in the sample—this one having a counter value of four—by two to obtain the correct number of photons generated by the first fluorescence-triggering light pulse, namely six photons. At the same time, the photon counter for the second position in the sample is corrected by decrementing by two and the overlapping of the fluorescence emission responses (even if composed of a single photon events) is compensated for.

The above mentioned numbers are given for explanation only and any number of photons may be detected for the first and second position in the sample. Further, the corresponding counters may be increased or decreased by any number of photons, the numbers may be different than the numbers given above as an exemplary example.

In one embodiment of the fluorescence microscopy method, the method may comprise the steps of generating pulsed illumination light at the clocking rate and/or transmitting of the pulsed illumination light along an illumination path into a sample volume and excitation of a sample received in the sample and/or scanning of the sample volume with the pulsed illumination light and/or detecting emission light generated in the sample volume and generating the fluorescent-light input signal.

In one embodiment of the inventive fluorescence microscope, the microscope may comprise a demixer with a signal input line for receiving the fluorescent-light input signal and/or a clocking rate input line for receiving a trigger signal being representative of a clocked time series of fluorescence-triggering light pulses. The clocking rate may be uniform or non-uniform. The demixer may comprise a storage unit for saving predetermined fluorescence parameters and/or a subtraction and addition module and/or a linear demixer module and/or a phasor-based demixer module.

The fluorescence microscope may in particular be a non-descanning scanning microscope having a higher yield of detected light compared to a descanned confocal microscope in which the fluorescent light is descanned by scanning mirrors and imaged through a pinhole onto the detector using a long optical path that includes many optical components.

As used herein the term "and/or" includes any and all combinations of one or more of the associated listed items and may be abbreviated as "/".

Although some features have been described in the context of an apparatus, it is clear that these features also represent a description of the corresponding method, where a block or device corresponds to a method step or a feature of a method step. Analogously, features described in the context of a method step also represent a description of a corresponding block or item or feature of a corresponding apparatus.

Some embodiments relate to a microscope comprising a system as described in connection with one or more of the FIGS. 1 to 3. Alternatively, a microscope may be part of or connected to a system as described in connection with one or more of the FIGS. 1 to 3. FIG. 4 shows a schematic illustration of a system 400 configured to perform a method described herein. The system 400 comprises a microscope 410 and a computer system 420. The microscope 410 is configured to take images and is connected to the computer system 420. The computer system 420 is configured to execute at least a part of a method described herein. The computer system 420 may be configured to execute a machine learning algorithm. The computer system 420 and microscope 410 may be separate entities but can also be integrated together in one common housing. The computer system 420 may be part of a central processing system of the microscope 410 and/or the computer system 420 may be part of a subcomponent of the microscope 410, such as a sensor, an actor, a camera or an illumination unit, etc. of the microscope 410.

The computer system 420 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 420 may comprise any circuit or combination of circuits. In one embodiment, the computer system 420 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 420 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 420 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 420 may also include a display device, one or more speakers, and a keyboard and/or controller, which can include a mouse, trackball, touch screen, voice-recognition device, or any other device that permits a system user to input information into and receive information from the computer system 420.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Figure 1:
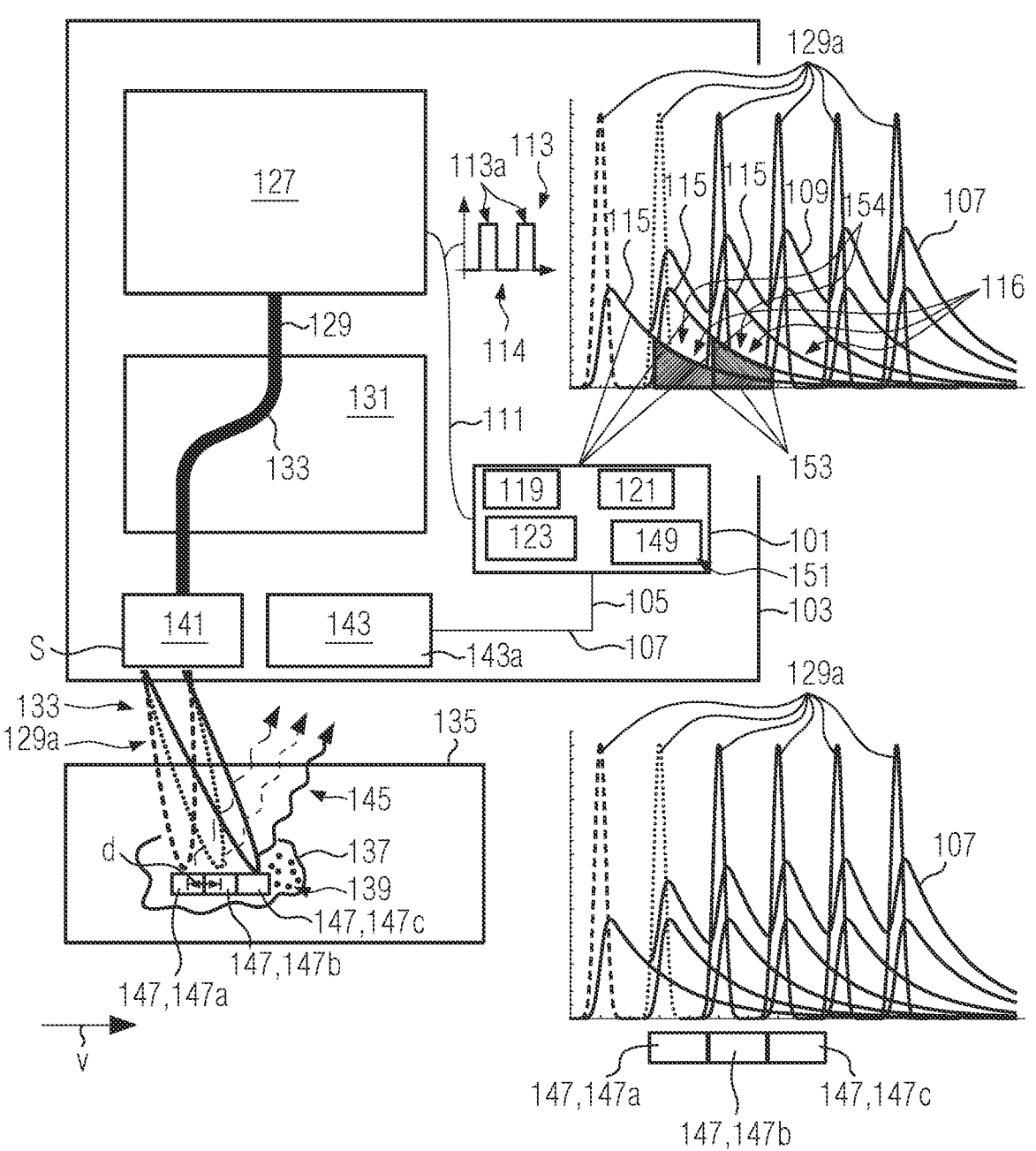
FIG. 1 a schematic illustration of one embodiment of the inventive processor and fluorescence microscope.

In FIG. 1 a schematic is shown for describing one embodiment of a fluorescence microscope 103, one embodiment of the inventive processor 101 as well as the computer-implemented method.

The fluorescence microscope 103 comprises an illumination unit 127 that generates pulsed illumination light 129 provided to an optical system 131. In the optical system 131 the pulsed illumination light 129 is transmitted and/or transformed and follows an illumination path 133 to a scanner 141.

The scanner deflects the illumination light 129 to different scan positions 147. The scan positions 147 denote different portions in a sample 137 that is provided within a sample volume 135. The sample 137 comprises fluorophores 139, wherein the illumination light 129 is preferably chosen to excite the fluorophores 139 provided in a sample 137.

In particular, the illumination light 129 comprises a series of fluorescence-triggering light pulses 129*a*.

Due to a scan speed v of the deflection of the illumination light 1 to 9 by the scanner 141 and a periodic time of the series of fluorescence-triggering light pulses 129*a*, the scan positions 147 are determined as well as a distance d between adjacent individual scan positions 147*a*, 147*b* and 147*c*.

At each scan position 147 emission light 145 is emitted. In order to differentiate the fluorescence-triggering light pulses 129*a* and the emission light 145, the latter is drawn with a dashed line for scan position 147*a*, with a dotted line for scan position 147*b* and a solid line for scan position 147*c*.

The illumination light 129, composed of fluorescence-triggering light pulses 129*a* is emitted at a clocking rate 114, wherein said clocking rate 114 is provided by the illumination unit 127 in the form of a trigger signal 113. The trigger signal 113 comprises time markers 113*a*. In the exemplary trigger signal 113 shown in FIG. 1, the trigger signal 113 comprises rectangular pulses and the time markers 113*a* are rising flanks of each rectangular parts. In other embodiments a different shapes of the trigger signal 113 are conceivable as well as different time markers, e.g. threshold values, local maxima or minima, falling flanks and the like. The trigger signal 113 is representative of the clocking rate 114 at which the clocked time series of fluorescence-triggering light pulses 129a is generated. The trigger signal 113 may provide information at what time and with what delay with respect to the fluorescence-triggering light pulses 129a fluorescence photons constituting the fluorescent-light input signal 107 are generated.

The trigger signal 113 is provided via a clocking rate input line 111 to the processor 101.

The emission light 145 is detected by an optical detector 143, which may for instance be a single photon detector 143a. The optical detector 143 is connected with the processor 101 with a signal input line 105, by which a fluorescent-light input signal 107 is provided to the processor 101.

The processor 101 comprises in the embodiment shown a subtraction and addition module 119, a linear demixer module 121, a phasor-based demixer module 123 and a storage unit 149 in which at least one fluorescence decay parameter is stored.

In other embodiments, the processor 101 comprises at least one of a subtraction and addition module 119, a linear demixer module 121, a phasor-based demixer module 123 and a storage unit 149, wherein these modules represent alternative means adapted for demixing a fluorescent-light input signal.

The processor 101 is adapted to separate at least one fluorescence emission response 115 from the fluorescent-light input signal 107. Therefore, the processor 101 is adapted to calculate portions 153 of a decay rest 154 of previous fluorescence emission responses 115.

An embodiment of the inventive computer-implemented method will be described with reference to FIG. 2.

Figure 2:
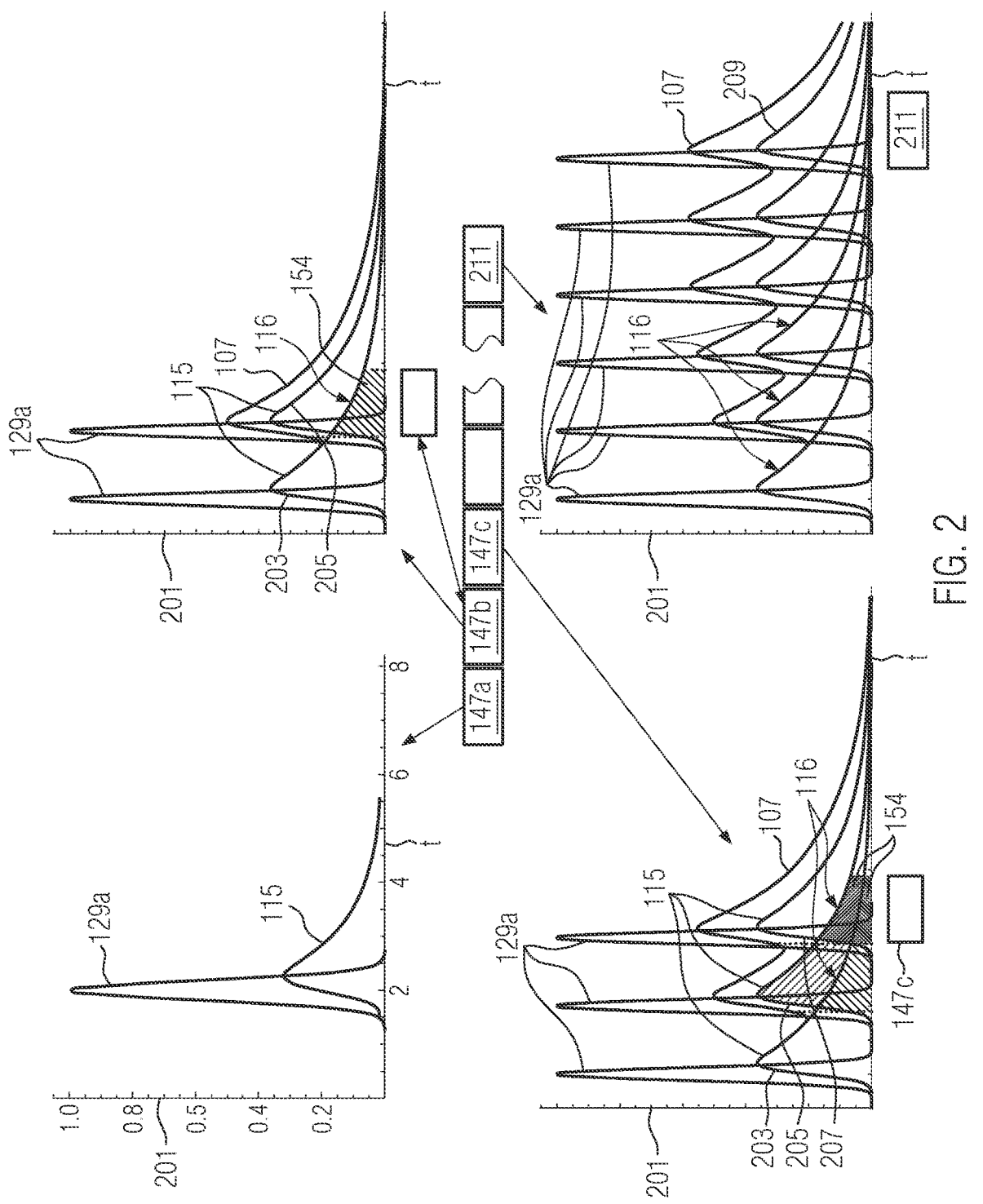
FIG. 2 a schematic of a working principle of one embodiment of the inventive computer-implemented method.

FIG. 2 shows the scan positions 147a, 147b and 147c, wherein it is assumed that at scan position 147a a measurement is started, i.e. there is no fluorescence-triggering light pulse 129a previously emitted from the illumination unit 127. At scan position 147a only one fluorescence emission response 115 is generated, which is shown in a plot that shows a (normalized) detector signal 201 over time t.

At scan position 147b a second fluorescence-triggering light pulse 129a illuminates the sample at a position different from the first scan position 147a. As the illumination is not descanned, i.e. by a pinhole, the optical detector 143 detects a decay rest 154 of the fluorescence emission response 115 generated at scan position 147a. This decay rest 154, respectively the decay tail 116 overlaps with the fluorescence emission response 115 generated at scan position 147b.

There is thus a first fluorescence emission response 203 and a second fluorescence emission response 205 that are detected at a different time t but which overlap each other forming the fluorescent-light input signal 107.

The processor 101 is adapted to calculate the decay rest 154 and to subtract it from the fluorescent-light input signal 107, thereby calculating the second fluorescence emission response 205.

Similarly, at scan position 147c, a third fluorescence-triggering light pulse 129a illuminates scan position 147c and generates a third fluorescence emission response 207.

At scan position 147c the optical detector 143 and thus detects decay tails 116 of the first fluorescence emission response 203 and the second fluorescence emission response 205. The corresponding decay rests 154 are subtracted from the fluorescence-light input signal 107 for calculating the third fluorescence emission response 207.

As can be seen from the figure, the decay tail 116 of the first fluorescence emission response 203 is overlapping with the third fluorescence emission response 207 but will not overlap with subsequent fluorescence emission responses 115. This may be different in other embodiments.

The same situation is shown for an N-th scan position 211, in which the decay tails 116 of the first, second and third fluorescence emission response 203, 205 and 207 do not influence the fluorescent-light input signal 107 any longer by overlapping with the N-th fluorescence emission response 209.

In FIG. 2, the fluorescent-light input signal 107 is formed by overlapping fluorescence emission responses 115 that equal each other. The fluorescence emission responses 115 therefore stem from the same fluorophore 139 excited by the same fluorescence-triggering light pulse 129a.

Figure 3:
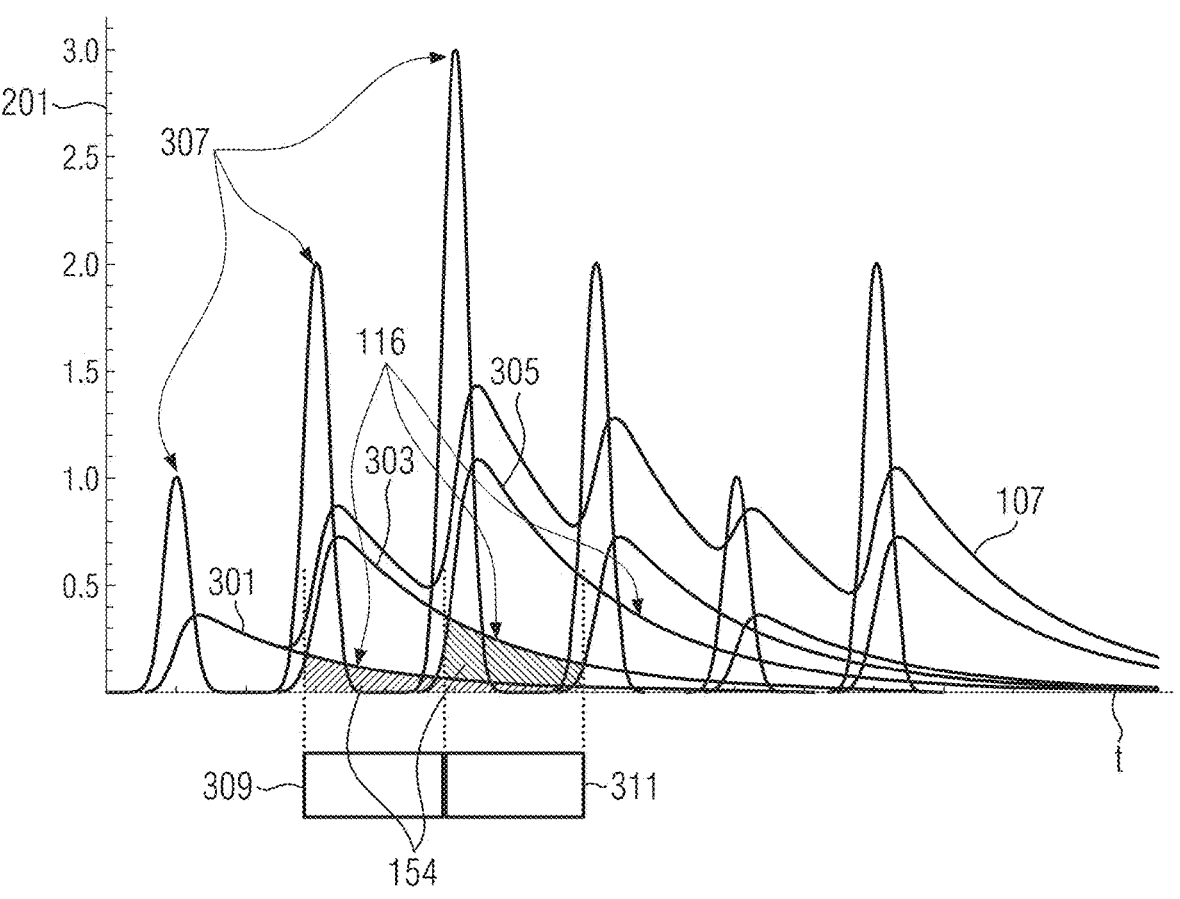
FIG. 3 a further schematic of the working principle of another embodiment of the inventive computer-implemented method.
Figure 4:
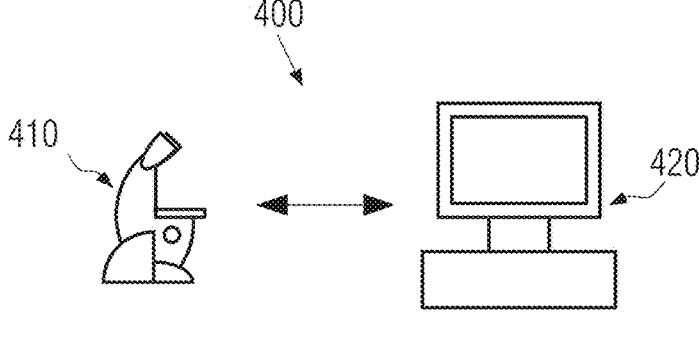
FIG. 4 a schematic illustration of a system configured to perform a method described herein.

In FIG. 3 the situation is shown for fluorescence emission responses 115 that are not equal to each other, i.e. that are generated by a fluorescence-triggering light pulses 129a with different amplitude 307.

In this case, the processor 101 is adapted to read the at least one fluorescence decay parameter 151 to determine a shape of a k-th fluorescence emission response 301, an 1-th fluorescence emission response 303, an m-th fluorescence emission response 305 and so on. The corresponding decay rests 154 are calculated by the processor 101 in the same manner as shown in FIG. 1 and FIG. 2. The decay rest 154 shown in FIG. 3 belong to the k-th fluorescence emission response 301 and the 1-th fluorescence emission response 303 and are subtracted from the fluorescent light input signal 107 for an 1-th scan position 309 and an m-th scan position 311 to calculate the 1-th fluorescence emission response 303 and the m-th fluorescence emission response 305, respectively.

In FIG. 5 to FIG. 8, different embodiments of the inventive method are depicted.

In FIG. 5, the method for demixing a fluorescent-light input signal of a fluorescence microscope comprises step 501: receiving a trigger signal comprising a time series of time markers and step 503: separating at least one fluorescence emission response from the fluorescent-light input signal.

In FIG. 6, the method for demixing a fluorescent-light input signal of a fluorescence microscope comprises step 601: receiving a trigger signal comprising a time series of time markers, step 603: computing a decay rest and step 605: subtracting the computed decay rest from the fluorescent-light input signal for separating at least one fluorescence emission response from the fluorescent-light input signal.

In FIG. 7, the method for demixing a fluorescent-light input signal of a fluorescence microscope comprises step 701: receiving a trigger signal comprising a time series of time markers, step 703: computing a decay rest, step 705: subtracting the computed decay rest from the fluorescent-light input signal for separating at least one fluorescence emission response from the fluorescent-light input signal and step 707: adding the computed decay rest to the previous fluorescence emission response.

In FIG. 8, the method for demixing a fluorescent-light input signal of a fluorescence microscope is applied to a non-continuous signal comprising single photon responses, this embodiment of the method comprises step 801: receiving a trigger signal comprising a time series of time markers, step 803: computing a decay rest that comprises a number (n) of single photon responses and computing the number (n) of single photon responses, step 805: sort the computed number of (n) single photon responses to a previous fluorescence emission response by increasing a counter of said previous fluorescence emission response by the computed number (n) of single photon responses and step 807:

decreasing a counter of the fluorescence emission response by the computed number (n) of single photon responses.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 101 processor
103 fluorescence microscope
105 signal input line
107 fluorescent-light input signal
111 clocking rate input line
113 trigger signal
113a time markers
114 Clocking rate
115 fluorescence emission response
116 decay tail
119 subtraction and addition module
121 linear demixer module
123 phasor-based demixer module
127 illumination unit
129 pulsed illumination light
129a fluorescence-triggering light pulse
131 optical system
133 illumination path
135 sample volume
137 sample
139 fluorophore
141 scanner
143 optical detector
143a single photon detector
145 emission light
147 scan position
147a, 147b, 147c individual scan position
149 storage unit
151 fluorescence decay parameter
153 portion
154 decay rest
201 detector signal 203 first fluorescence emission response
205 second fluorescence emission response
207 third fluorescence emission response
209 N-th fluorescence emission response
211 N-th scan position
301 k-th fluorescence emission response
303 l-th fluorescence emission response
305 m-th fluorescence emission response
307 amplitude
309 l-th scan position
311 m-th scan position
400 system
410 microscope
411 fluorescence microscope
420 computer system
501, 601, 701, 801 receiving a trigger signal
503 separating at least one fluorescence emission response
603, 703 computing a decay rest
605, 705 subtracting the computed decay rest from the fluorescent-light input signal
707 adding the computed decay rest to the previous fluorescence emission response
803 computing a decay rest that comprises a number (n) of single photon responses and computing the number (n) of single photon responses
805 sort the computed number of (n) single photon responses to a previous fluorescence emission response by increasing a counter of said previous fluorescence emission response by the computed number (n) of single photon responses
807 decreasing a counter of the fluorescence emission response by the computed number (n) of single photon responses
N number of fluorescence emission responses
t time
v scan speed

The invention claimed is:

1. A processor for demixing a fluorescent-light input signal of a fluorescence microscope, the fluorescent-light input signal comprising at least two fluorescence emission responses that overlap in time, each of the at least two fluorescence emission responses being representative of an individual impulse response of a fluorophore to a fluorescence-triggering light pulse of a clocked time series of fluorescence-triggering light pulses, the processor being configured to:

receive a trigger signal comprising a time series of time markers, the trigger signal being representative of a clocking rate, at which the clocked time series of fluorescence-triggering light pulses is generated; and separate at least one fluorescence emission response from the fluorescent-light input signal by at least one of:

computing at last one decay rest, and subtracting the at least one decay rest from the fluorescent-light input signal, the decay rest being representative of at least one portion of a decay tail of a previous fluorescence emission response;

linearly unmixing of the fluorescent-light input signal; or phasor-based unmixing of the fluorescent-light input signal.

2. The processor of claim 1, wherein the processor is configured to separate the fluorescence emission responses depending on at least one fluorescence decay parameter, the at least one fluorescence decay parameter representing at least one parameter of the impulse response.

3. The processor of claim 2, wherein the processor is configured to determine a number of subsequently generated fluorescence emission responses that overlap at a given position in the fluorescent-light input signal.

4. The processor of claim 3, wherein the processor is configured to compute the number of subsequently generated fluorescence emission responses that overlap at the given position in the fluorescent-light input signal depending on at least one of the clocking rate and at least one fluorescence decay parameter.

5. The processor of claim 2, wherein the processor is configured to determine a scan position in a sample depending on the clocking rate and a scan speed, at which the clocked fluorescence-triggering light pulses are scanned over the sample.

6. A fluorescence microscope, comprising:

the processor of claim 1.

7. The fluorescence microscope of claim 6, further comprising:

a clocked illumination unit configured to generate the clocked fluorescence-triggering light pulses at the clocking rate.

8. The fluorescence microscope of claim 6, further comprising:

an optical detector configured to detect emission light generated at two or more different scan positions in a sample volume, the emission light being further generated by the clocked fluorescence-triggering light pulses of the pulsed illumination light of the illumination unit, the clocked fluorescence-triggering light pulses being displaced relative to one another in both, time and position.

9. The fluorescence microscope of claim 6, wherein the clocking rate depends on the at least one fluorescence decay parameter.

10. A processor for demixing a fluorescent-light input signal of a fluorescence microscope, the fluorescent-light input signal comprising at least two fluorescence emission responses that overlap in time, each of the at least two fluorescence emission responses being representative of an individual impulse response of a fluorophore to a fluorescence-triggering light pulse of a clocked time series of fluorescence-triggering light pulses, the processor being configured to:

receive a trigger signal comprising a time series of time markers, the trigger signal being representative of a clocking rate, at which the clocked time series of fluorescence-triggering light pulses is generated; and separate at least one fluorescence emission response from the fluorescent-light input signal by:

computing at last one decay rest, wherein the at least one decay rest comprises a number of portions of decay tails, and subtracting the decay rest from the fluorescent-light input signal, each of the decay tails corresponding to an impulse response generated by a different clocked fluorescence-triggering light pulse.

11. A non-transitory computer-readable medium having processor-executable instructions stored thereon, wherein the processor-executable instructions, when executed by a processor, facilitates performance of a method for demixing a fluorescent-light input signal of a fluorescence microscope, the fluorescent-light input signal comprising at least two fluorescence emission responses that overlap in time, each of the at least two fluorescence emission responses being representative of an individual impulse response of a fluorophore to a fluorescence-triggering light pulse of a clocked time series of fluorescence-triggering light pulses, the method comprising:

receiving a trigger signal comprising a time series of time markers, the trigger signal being representative of a clocking rate, at which the clocked time series of fluorescence-triggering light pulses is generated; and separating at least one fluorescence emission response from the fluorescent-light input signal by at least one of:

computing at last one decay rest, and subtracting the at least one decay rest from the fluorescent-light input signal, the decay rest being representative of at least one portion of a decay tail of a previous fluorescence emission response;

linearly unmixing of the fluorescent-light input signal; or phasor-based unmixing of the fluorescent-light input signal.

12. A fluorescence microscopy method, comprising:

generating of clocked fluorescence-triggering light pulses at a clocking rate; and the computer-implemented method of claim 11.

* * * * *